United States Patent

Ando et al.

[11] 4,053,672
[45] Oct. 11, 1977

[54] HOT STAMP TRANSFER PRESS PLATE

[75] Inventors: Ken Ando, Ikoma; Minoru Kamosaki, Ohimachi; Yoshinobu Ohya, Amagasaki; Sigeru Asai, Ohimachi, all of Japan

[73] Assignee: Daicel, Ltd., Osaka, Japan

[21] Appl. No.: 616,112

[22] Filed: Sept. 23, 1975

[30] Foreign Application Priority Data

Sept. 24, 1974 Japan .................................. 49-109786

[51] Int. Cl.² ............................................. B32B 3/00
[52] U.S. Cl. ..................................... 428/207; 106/20; 260/37 P; 260/39 P; 428/195; 428/209; 428/474
[58] Field of Search ............... 428/195, 207, 209, 474; 101/1, 426; 260/72 N, 78, 37 P, 39 R, 39 P, 40 R, 78 TF, 78 UA, 78 S, 78 SC; 106/20, 22, 23, 30

[56] References Cited

U.S. PATENT DOCUMENTS

| 2,430,860 | 11/1947 | Cairns | 260/72 N |
| 2,430,907 | 11/1947 | Cairns | 260/72 N |
| 2,430,923 | 11/1947 | Foster et al. | 260/72 N |
| 2,430,950 | 11/1947 | Rothrock | 260/72 N |
| 2,443,450 | 6/1948 | Graham et al. | 260/72 N |

Primary Examiner—Thomas J. Herbert, Jr.
Assistant Examiner—Bruce H. Hess
Attorney, Agent, or Firm—Blanchard, Flynn, Thiel, Boutell & Tanis

[57] ABSTRACT

A hot stamp transfer press plate comprising a transfer medium on which a transfer layer has been applied in a desired pattern, said transfer layer consisting of hot stamp ink wherein there is employed, as the binder resin of the ink, methoxymethylated nylon copolymer obtained by N-methoxymethylation of an alcohol-soluble nylon copolymer containing a higher nylon salt, ω-amino acid or lactam, each of which has 10 or more carbon atoms.

3 Claims, 1 Drawing Figure

CURVES SHOWING MELTING BEHAVIOR

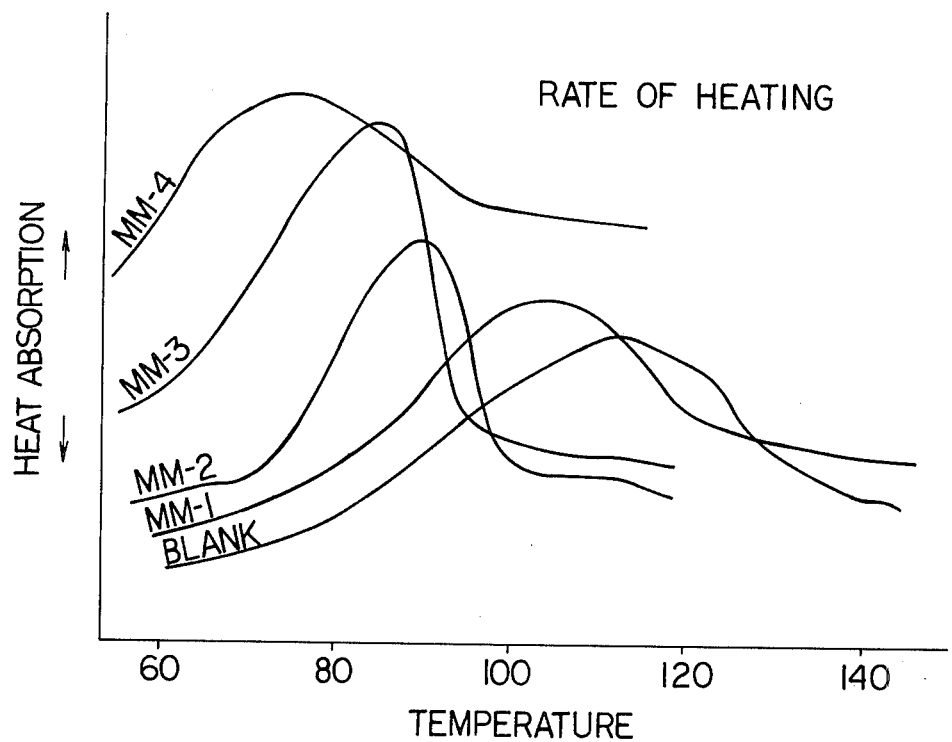

HOT STAMP TRANSFER PRESS PLATE

BACKGROUND OF THE INVENTION

1. Field of the Invention

This invention relates to a transfer press plate having applied thereon a stamp ink that shows wear-resistance and solvent-resistance, and which possesses excellent bonding properties to fibers, metals, synthetic resins, leather, glass and the like materials.

2. Description of the Prior Art

Conventional practice in hot stamping has been to print an image on a transfer paper by a silk sceen printing process, using a hot stamp ink, and to transfer the image thus formed on the transfer paper onto the final carrier by means of a hot stamping machine at an appropriate temperature, pressure and time. The transfer ink used for this purpose is generally composed of a thermoplastic resin as a binder resin, such as vinyl chloride-vinyl acetate copolymers, acrylic resins and polyesters.

Recently, the hot stamp inks of this type can be printed on a transfer paper fairly well, because such inks show somewhat improved flow, length, viscosity and the like properties (hereinafter designated generically as printability) while there is less tendency for the ink to plug the meshes of the silk screen. However, the performance of such an ink during and after hot stamping thereof onto the final carrier or substrate still leaves much to be desired. For instance, the hot stamp ink containing vinyl chloride-vinyl acetate copolymer, acrylic resin and polyesters as defined above cannot be bonded with sufficient strength to the final carrier except for carriers made of fibers and some synthetic resin materials. Moreover, it shows only poor solvent-resistance and wear-resistance, which leads to the inhibition of doping and the tendency for the ink film to discolor or scale off from the surface of the final carrier.

SUMMARY OF THE INVENTION

We have discovered that a transfer medium, such as a transfer paper, to which is applied a hot stamp ink containing methoxymethylated nylon copolymer obtained by N-methoxymethylation of an alcohol-soluble nylon copolymer containing a higher nylon salt, ω-amino acid or lactam, each of which has 10 or more carbon atoms, possesses improved printability onto the final substrate.

Nylon copolymers are generally soluble in alcoholic solvents and are used as hot-melt adhesives. When used as hot stamp inks, they cannot be obtained in the form of highly concentrated solutions because of their limited solubility in the solvents. Moreover, the resulting liquid products are unstable and tend to form gels in a short time, thus making them almost unusable as ink components. It has now been discovered that the methoxymethylated nylon copolymers obtained by coupling methoxymethyl groups to the nitrogen atoms of alcohol-soluble nylon copolymers have improved solubility in the alcoholic solvents and that the resulting solution is highly stable and is not likely to form gels or undergo changes in viscosity for a prolonged time. This property can be retained with an increase in the concentration of the methoxymethylated nylon copolymer, and thus it can be used as an ink component with good results.

The methoxymethylation ratio means the ratio of the number of nitrogen atoms bonded to methoxymethyl groups to the total number of nitrogen atoms contained in the nylon copolymer.

The methoxymethylation ratio of the nylon copolymers, according to the invention, should be in the range of 10 to 30% and preferably in the range of 15 to 25%. A methoxymethylation ratio of less than 10% is insufficient to impart to the resin an improved solubility in the alcoholic solvent, whereas a ratio higher than 30% results in an extremely soft product which shows a tendency toward blocking and low film strength.

As shown in the drawing, the melting point of the methoxymethylated nylon copolymer containing higher nylon salts, ω-amino acid or lactam having more than 10 carbon atoms, is shifted downwardly and tends to show a well-defined peak value. Thus, the untreated nylon copolymer (without methoxymethylation) melts over a wide range of melting temperature, whereas the MM-2 and MM-3 samples having methoxymethylation ratios of 15.6% and 20.5%, respectively, have a lower and well-defined range of melting temperatures. On the contrary, the MM-1 sample having a methoxymethylation ratio of 9.5% shows a melting point range which is not changed appreciably from that of the untreated nylon copolymer, while the MM-4 sample having a methoxymethylation ratio of 34.5% has a lower, but a rather broad, range of melting temperature.

The lower and well-defined melting range of methoxymethylated (10 to 30%) nylon copolymer means that the inks containing them can be applied for hot stamping at a lower temperature and in a shorter time. They also show improved wetting and penetrating properties when transferred to the final substrate.

The methoxymethylated nylon copolymer according to the present invention has an improved affinity and compatibility with other materials by virtue of the fact that active groups other than amide groups have been introduced into the molecular structure of the nylon copolymer. While conventional hot stamp inks can be transferred only with considerably difficulty to colored substrate materials because of their poor hiding power, the inventive inks can more easily be transfer printed even onto colored substrate materials. Moreover, the inventive inks show an improved wear-resistance when applied as an ink film on the substrate material.

The present invention is directed to a hot stamp transfer press plate on which a hot stamp ink containing methoxymethylated nylon copolymers is applied in a desired pattern or configuration to form a heat-transferable image thereon.

The alcohol-soluble nylon obtained by N-methoxymethylation of a nylon having less than 10 carbon atoms, such as type 8 nylon obtained by methoxymethylation of nylon 6, cannot be used as a hot stamp ink because of its considerable hygroscopicity and poor weatherability.

The term higher nylon salt refers to the conventional class of reaction products of diamines with dicarboxylic acids useful as intermediates in the preparation of nylon polymers, exemplified by the reaction of hexamethylene diamine with adipic acid to form nylon 66 salt and the reaction of hexamethylene diamine with sebacic acid to form nylon 610 salt. As indicated, the sum of the carbon atoms is at least 10. The term ω-amino acid refers to a conventional class of materials used in the preparation of nylon polymers, exemplified by ω-aminocaproic acid for nylon 6 and ω-aminoundecanoic acid for nylon 11. The term lactam refers to a conventional class of materials used in the preparation of nylon polymers, exemplified by caprolactam for nylon 6 and lauryl lactam for nylon 12.

It is preferred to employ nylon copolymers of two or more of nylon 6, nylon 11, nylon 12, nylon 66 and nylon 610 having melting points of less than 150° C. It is especially preferred to employ terpolymers of nylon 12: nylon 6: nylon 66, copolymerized in a weight ratio of 25–45 : 25–45 : 25–45 percent by weight.

A preferred lactam with more than 10 carbon atoms is ω-laurolactam. Among the ω-amino acids with more than 10 carbon atoms there can be named ω-aminodecanoic acid, ω-aminoundecanoic acid, ω-aminododecanoic acid and ω-aminotridecanoic acid. Among higher nylon salts with more than 10 carbon atoms there can be named hexamethylenediamine sebacate, dodecanedicarboxylic acid salt of hexamethylenediamine, tridecanedicarboxylic acid salt of hexamethylenediamine, decamethylenediamine sebacate, dodecanedicarboxylic acid salt of decamethylenediamine, tridecanedicarboxylic acid salt of decamethylenediamine, tridecanedicarboxylic acid salt of dodecamethylenediamine, dodecanedicarboxylic acid salt of dodecamethylenediamine, decamethylenediamine azelate, dodecamethylenediamine azelate, tridecamethylenediamine azelate, or the mixtures thereof.

The temperatures, pressures and times of the hot stamp transfer operation are those which are effective to transfer the ink from the press plate to the carrier. Pressures in the range of 0.2 to 3 metric tons/cm$^2$, temperatures with range of 120° to 220° C and pressing times of 0.2 to 20 seconds give satisfactory results.

BRIEF DESCRIPTION OF THE DRAWING

The drawing is a graph showing the melting behavior for the invention copolymers and the comparative polymers.

The present invention will be further described by reference to the following illustrative examples. Example 1

50 grams of a polyamide copolymer having a melting point of 130° C, relative viscosity of 1.80 and melt index of 9.5, synthesized from 60 parts of caprolactam, 20 parts of nylon 66 salts and 40 parts of lauryllactam (hereafter designated as MM-0), 20 grams of paraformaldehyde and 60 grams of methanol, were charged into a stainless steel autoclave and heated under agitation. After the nylon copolymer component was dissolved completely, a methanol solution containing 2 grams of 85% phosphoric acid was added at 60° C to the resulting solution and the reaction was continued for 30 minutes. After cooling, the resulting product was added under agitation to a large quantity of water. Thus, an N-methoxymethylated nylon copolymer with a methoxymethylation ratio of 15.6% (designated as MM-2) was obtained. In a similar manner, N-methoxymethylated nylon copolymers with methoxymethylation ratios of 9.5% (MM-1), 20.5% (MM-3) and 34.5% (MM-4) were obtained.

These N-methoxymethylated products were thoroughly dried under vacuum for removing the moisture. Then, 20 grams of each of these liquid products was added to 80 grams of methanol and each of the resulting mixtures was heated under agitation in a sealed flask fitted with a condenser until it dissolved completely. Table 1 shows the temperatures of the resulting liquid products and the gellating time periods. Table 2 shows the results of the Taper wear resistance tests conducted on each of coating films, 20 μ thick, of the resulting liquid products applied on a soft copper plate, 0.5 mm thick, with a smooth surface degreased in advance with trichloroethylene, and of the tests of the physical properties of films made of the same liquid products each applied at a thickness of 40 μ cast on a polytetrafluoroethylene resin sheet, said films being dried for 5 minutes at room temperature and then by using a hot air current of 80° C for 30 minutes. The Taper wear resistance test was conducted in accordance with JIS K-6902.

Table 1

| | Temperatures of solutions and gellating time *1 | | | |
|---|---|---|---|---|
| | Conc. of solid | Solution Temperature | | |
| Sample | contents (wt.%) | 5° C | 15° C | 25° C |
| MM-0 (control) | 20 | 15 min. | 45 min. | 2.5 hrs. |
| MM-1 (control) | " | 2 hrs. | 20 hrs. | 48 hrs. |
| MM-2 (invention) | " | 24 hrs. | not gellated | not gellated |
| MM-3 (invention) | " | over 1 week | " | " |
| MM-4 (control) | " | " | " | " |

*1 The gellating time means the time that elapsed until the solution essentially has lost its capability of flowing.

Table 2

| | Physical properties and wear-resistance | | |
|---|---|---|---|
| | Breaking Points | | |
| Samples | Strength (kg/cm) | Elongation (%) | Taper wear (mg) *1 |
| MM-0 (control) | 340 | 410 | 15.0 |
| MM-1 (control) | 330 | 450 | 8.5 |
| MM-2 (invention) | 240 | 580 | 4.3 |
| MM-3 (invention) | 210 | 600 | 4.5 |
| MM-4 (control) | 160 | 700 | 10.0 |

*1 Taper wear means the maximum wear in mgs at CS-17 (rubstone performance), 1 kg load and 1,000 revolutions.

It will be seen from Table 1 that the samples MM-0 and MM-1 having methoxymethylation ratios of 0% and 9.5% tend to form gels in a short time because of their reduced solubility in alcohols. The samples MM-2, MM-3 and MM-4 with methoxymethylation ratios higher than 15% are stable and free of gel formation for a longer time because of their improved solubility in alcohol and thus hot stamp inks made from them can be stored for a long time.

It will also be seen from Table 2 that the samples MM-2 to MM-4 show a behavior similar to that of rubber. It has been demonstrated from the Taper wear tests that the control samples MM-0, MM-1 and MM-4 are somewhat inferior in wear-resistance, but excellent wear-resistance is obtained with samples MM-2 with a methoxymethylation ratio of 15.6% and MM-3 with a methoxymethylation ratio of 20.5%.

EXAMPLE 2

Hot stamp ink samples were prepared from the nylon copolymer obtained in Example 1 (MM-0) and N-methoxymethylated products thereof (MM-1 to MM-4). Thus, to a mixture of 84 grams of benzyl alcohol, 36 grams of toluene and 12 grams of methanol there were added 20 grams of bentonite and 40 grams of nylon copolymer (MM-0), and the resulting mixture was heated under agitation to form a uniform solution. Then 20 grams of a pigment (Chrome Yellow Y-469-D-manufactured by Du Pont) were added to the resulting solution under further heating and agitation. Thus, a silk screen ink sample for hot stamp printing was obtained.

The N-methoxymethylated nylon copolymers (MM-1 to MM-4) were treated in the similar manner to form silk screen ink samples for hot stamp printing.

Printing was made on a transfer medium or carrier by use of these hot stamp ink samples and by employing the conventional silk screen printing method. Hot stap printing was then performed on various materials by using a stamping machine ("Pearlmarker" manufactured by Ohira Tekko Co., Ltd.). Hot stamp printing was effected in such instantaneous manner as with a hammer. Table 3 shows the printability of these hot stamp ink samples on a silk screen, as well as the drying degree and the state of the ink films applied to the transfer medium. Table 4 shows the results of printing tests on various materials conducted by using the above ink samples and a conventional ink sample containing vinyl chloride-vinyl acetate copolymer.

Table 3

| Polymer employed in ink samples | Printability on silk screen | Drying degree of ink samples | States of ink sample films |
|---|---|---|---|
| MM-0 (control) | ink does not flow well and the silk screen meshes tend to become plugged | dried in 5 min. at room temperature | ink film tends to scale off from the transfer paper |
| MM-1 (control) | " | " | " |
| MM-2 (invention) | ink flows well and the silk screen meshes are not plugged | dried thoroughly in 10 min. at room temperature | no flocking and good bonding with transfer paper |
| MM-3 (invention) | " | " | " |
| MM-4 (control) | " | dried very promptly | high blocking tendency of ink film | ing the solvents. Moreover, the latter ink sample gives a film with higher tendency to blocking.

It can also be seen from Table 4 that the ink samples containing MM-2 and MM-3 show better bonding properties with various materials than those containing MM-0 and MM-1 and the conventional ink sample containing vinyl chloride - vinyl acetate copolymer.

The embodiments of the invention in which an exclusive property or privilege is claimed are defined as follows:

1. A hot stamp transfer press plate comprising a transfer substrate having a hot stamp ink applied thereon in a pattern, said hot stamp ink comprising a mixture of pigment and binder resin, said binder resin consisting essentially of a methoxymethylated nylon copolymer prepared by methoxymethylating an alcohol-soluble nylon copolymer of two or more members selected from the group consisting of nylon 6, nylon 11, nylon 12, nylon 66 and nylon 610, said nylon copolymer having a melting point of less than 150° C, said methoxymethylated nylon copolymer having a methoxymethylation ratio in the range of from 10 to 30%, wherein the methoxymethylation ratio is the ratio of nitrogen atoms bonded to methoxymethyl groups to the total number Table 4

Hot stamping performance with various materials

| | | Polymers contained in ink samples | | | | | |
|---|---|---|---|---|---|---|---|
| Substrate Materials | Hot stamping conditions | MM-0 (control) | MM-1 (control) | MM-2 (invention) | MM-3 (invention) | MM-4 (control) | vinyl chloride-vinyl acetate copolymer (control) |
| blended fabric based on cotton | 150° C, 1 ton/cm, 1 sec. | 3 | 3 | 5 | 5 | 5 (BL) *2 | 5 |
| Al plate *3 | 200° C, 2 ton/cm, 2 sec. | 3 | 3 | 5 | 5 | 1 (") | 3 |
| ox leather | 160° C, 1 ton/cm, 2 sec. | 3 | 3 | 5 | 5 | 3 (") | 3 |
| soda *4 glass | 180° C, 0.5 t/cm, 3 sec. | 1 | 1 | 5 | 5 | 1 (") | 1 |
| polyurethane sheet | 190° C, 1 t/cm, 1 sec. | 5 | 5 | 5 | 5 | 3 (") | 3 |
| ABS sheet | 150° C, 1 t/cm, 2 sec. | 1 | 1 | 3 | 3 | 1 (") | 3 |
| laminated board | 150° C, 1 t/cm, 2 sec. | 3 | 3 | 5 | 5 | 3 (") | 3 |
| corrugated cardboard | 150° C, 0.5 t/cm, 1 sec. | 3 | 3 | 5 | 5 | 3 (") | 3 |

*1 The scaling degrees of the various ink samples were ranked by scaling tests with use of adhesive tapes so that 5 stands for non-scaling, 3 for partial scaling and 1 for almost complete scaling.
*2 (BL) designates tackiness and blocking properties of ink films.
*3 Al plate (1.0 mm thick) was heated in advance to 90° C.
*4 Glass plate (2.7 mm thick) was heated in advance to 120° C.

It will be seen from Table 3 that the ink samples containing MM-0 and MM-1 show poor printability and "lay" on the transfer medium. On the contrary, the ink samples containing MM-2 and MM-3 show good printability and "lay" on the transfer medium, while the ink sample containing MM-4 shows good printability but dries slowly and there may be some difficulty in removing of nitrogen atoms contained in the methoxymethylated nylon copolymer.

2. A hot stamp transfer press plate according to claim 1, in which said nylon copolymer is a terpolymer of nylon 12 : nylon 6 : nylon 66, copolymerized in a weight ratio of 25–45 : 25–45 : 25–45.

3. A hot stamp transfer press plate according to claim 2, in which the methoxymethylation ratio is from 15 to 25%.